(12) United States Patent
Ando et al.

(10) Patent No.: US 9,819,366 B2
(45) Date of Patent: Nov. 14, 2017

(54) WIRELESS COMMUNICATIONS DEVICE AND WIRELESS SIGNAL PROCESSING METHOD

(71) Applicant: FUJITSU LIMITED, Kawasaki-shi, Kanagawa (JP)

(72) Inventors: Kazuaki Ando, Shibuya (JP); Tokuro Kubo, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/295,682

(22) Filed: Oct. 17, 2016

(65) Prior Publication Data

US 2017/0111062 A1 Apr. 20, 2017

(30) Foreign Application Priority Data

Oct. 20, 2015 (JP) .................................. 2015-206271

(51) Int. Cl.
*H01Q 11/12* (2006.01)
*H04B 1/00* (2006.01)

(52) U.S. Cl.
CPC ........... *H04B 1/001* (2013.01); *H04B 1/0078* (2013.01)

(58) Field of Classification Search
CPC .......... H04B 1/18; H04B 1/406; H04B 1/403; H04B 1/408; H04B 1/52; H04B 1/7085; H04B 1/7174
USPC ........................................................ 455/118
See application file for complete search history.

(56) References Cited

U.S. PATENT DOCUMENTS

| 6,950,478 B1 * | 9/2005 | Rothenberg ........... H03D 3/007 375/295 |
| 2008/0013639 A1 | 1/2008 | Rick et al. |

FOREIGN PATENT DOCUMENTS

| JP | 5-244032 A | 9/1993 |
| JP | 2009-544254 A | 12/2009 |

* cited by examiner

*Primary Examiner* — Ajibola Akinyemi
(74) *Attorney, Agent, or Firm* — Arent Fox LLP

(57) ABSTRACT

A wireless communication device including: a mixer configured to generate two mixed signal in a lower frequency band than a frequency of a local signal and two mixed signals in a higher frequency band than the frequency of the local signal by mixing the local signal with two intermediate frequency signals, and a filter configured to pass one of the two mixed signal in the lower frequency band and one of the two mixed signal in the higher frequency band.

5 Claims, 10 Drawing Sheets

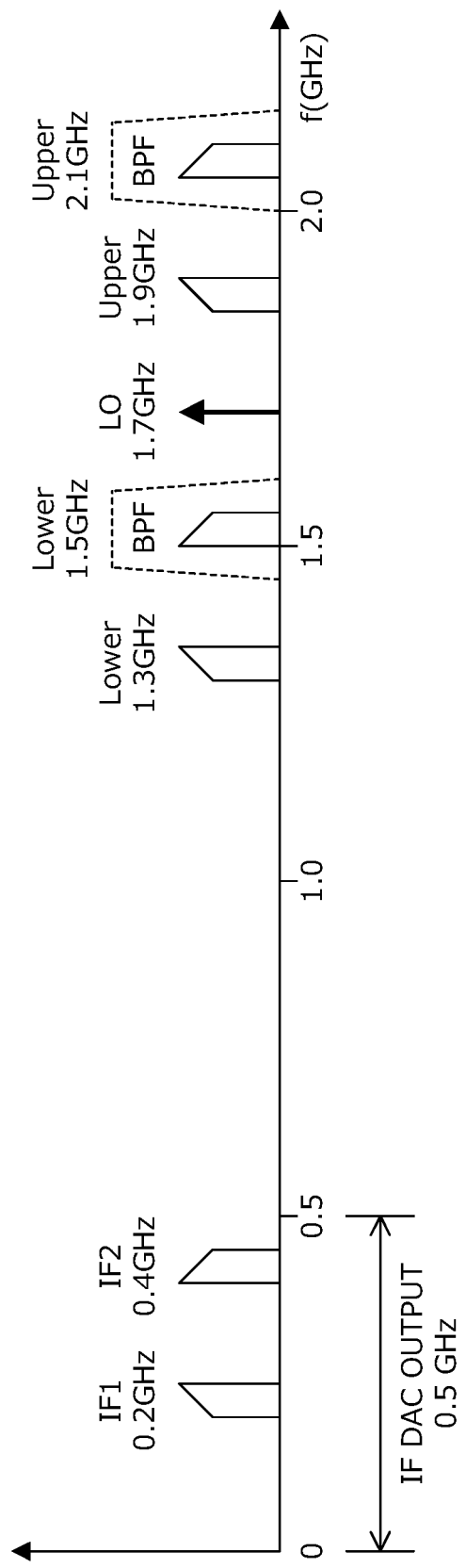

WIRELESS COMMUNICATIONS DEVICE AND WIRELESS SIGNAL PROCESSING METHOD

CROSS-REFERENCE TO RELATED APPLICATION

This application is based upon and claims the benefit of priority of the prior Japanese Patent Application No. 2015-206271, filed on Oct. 20, 2015, the entire contents of which are incorporated herein by reference.

FIELD

The embodiments described herein are related to a wireless communication device and a wireless signal processing method.

BACKGROUND

A wireless communication device is known that generates and transmits plural radio frequency (RF) signals (for example, see Japanese National Publication of International Patent Application No. 2009-544254 and Japanese Laid-open Patent Publication No. 5-244032). Here, "RF signal" may also be referred to as "transmission frequency signal".

In the wireless communication device, a digital to analogue conversion of an intermediate frequency (IF) signal is performed by a digital to analogue converter (DAC), and the IF signal converted from digital to analogue is passed through a bandpass filter (BPF). Then, the wireless communication device further passes a signal through a BPF, a signal having been obtained by mixing the IF signal that has passed through the BPF and a local oscillator (LO) signal in a mixing unit, thereby generating an RF signal.

Here, "IF signal" may also be referred to as "intermediate frequency signal", and "LO signal" may also be referred to as "local signal" or "local oscillation signal".

SUMMARY

According to an aspect of the invention, a wireless communication device includes a mixer configured to generate two mixed signal in a lower frequency band than a frequency of a local signal and two mixed signals in a higher frequency band than the frequency of the local signal by mixing the local signal with two intermediate frequency signals, and a filter configured to pass one of the two mixed signal in the lower frequency band and one of the two mixed signal in the higher frequency band.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a DAC IF signal output bandwidth relative to frequencies illustrated in FIG. 7.

DESCRIPTION OF EMBODIMENTS

Figure 1:
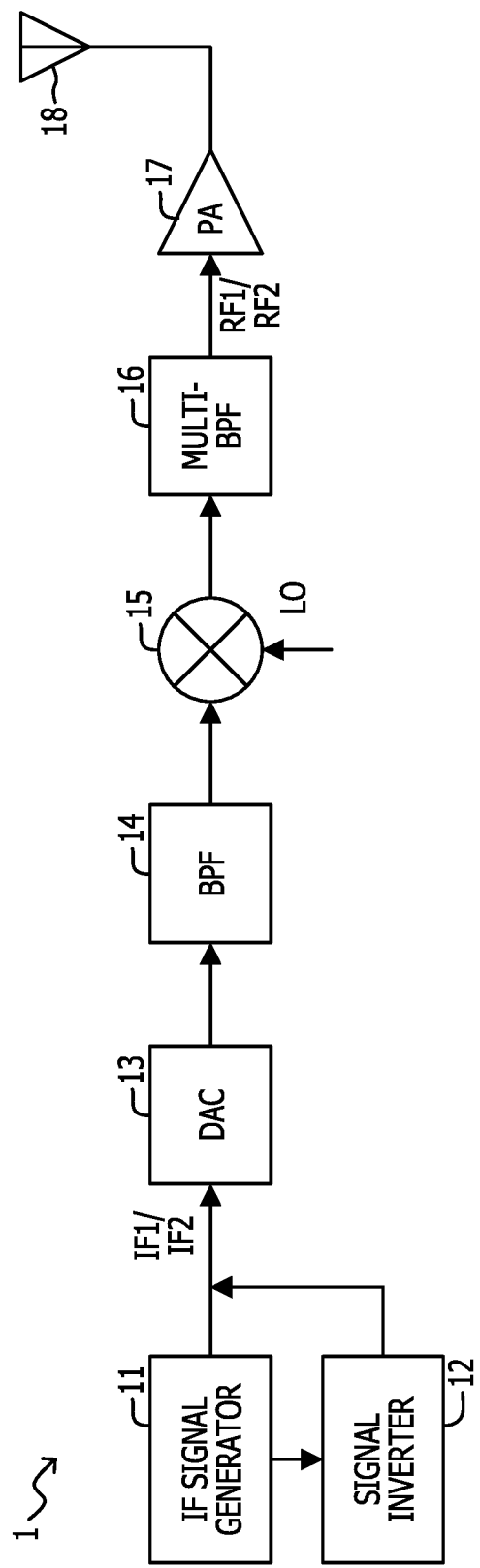
FIG. 1 is a block diagram illustrating an example of a functional configuration of a wireless communication device according to an embodiment.

A wireless communication device may perform transmission of plural RF signals respectively having different frequency bands. In this case, the wireless communication device may include a DAC, a BPF, and a mixing unit, for each of the RF signals. Thus, in this case, there is a problem that the circuit size of the wireless communication device increases.

An object of the technology described herein is to reduce the circuit size of a wireless communication device.

Next, an explanation of embodiments of the technology follows with reference to the drawings. Note that the embodiments described below are merely examples, and it is not intended to exclude various modifications or application of technologies not specified in the embodiments. Namely, the embodiments may be implemented with various modifications within a range not departing from the gist of the embodiments.

In addition, in each drawing, it is not intended that configuration elements are limited to the configuration elements illustrated therein, but other configuration elements may also be included. In the drawings, portions appended with the same reference symbol indicates the same or similar portions unless otherwise specified.

A. Embodiment

FIG. 1 is a block diagram illustrating an example of a functional configuration of a wireless communication device 1 according to an embodiment.

The wireless communication device 1, for example, transmits generated multiband RF signals (for example, in 2 bands) through a transmission antenna 18. Here, "wireless communication device" may be also referred to as "wireless circuit". In addition, "RF signal" may be also referred to as "transmission frequency signal".

"Multiband", for example, refers to plural frequency bands. The wireless communication device 1 may generate and transmit a first RF signal (in other words, RF1 signal)

and a second RF signal (in other words, RF2 signal) having a frequency in a frequency band different from that of the RF1 signal.

Figure 2:
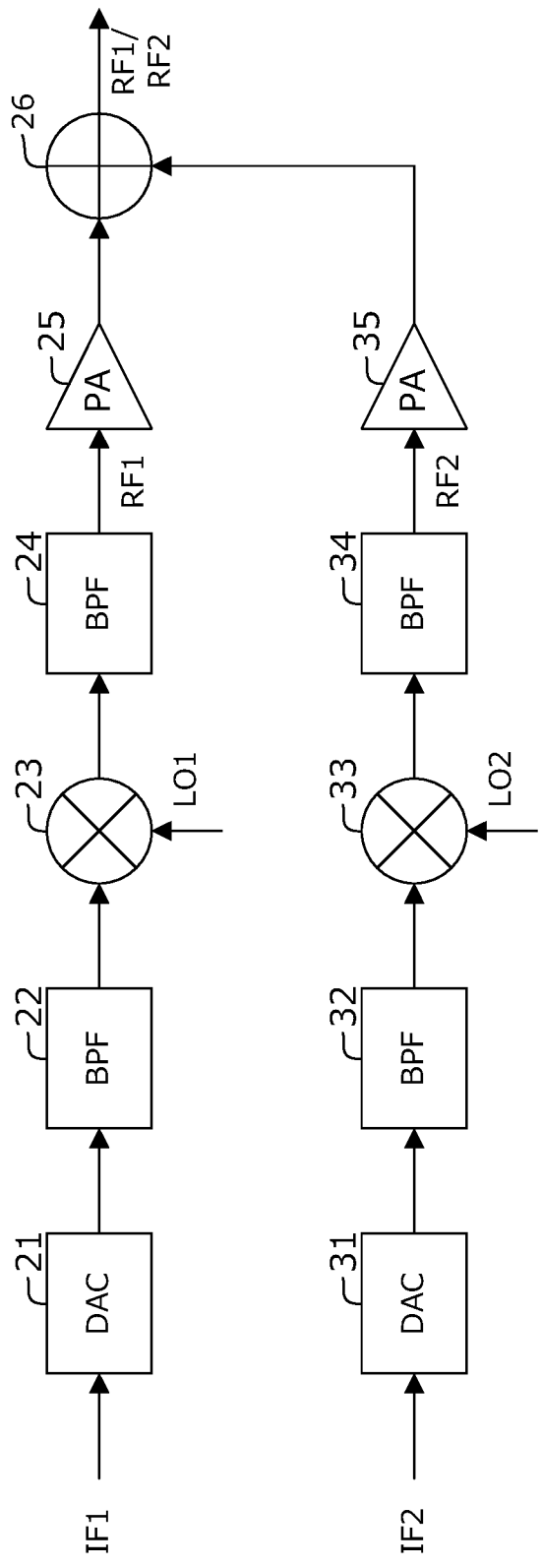
FIG. 2 is a block diagram illustrating an example of a functional configuration of a wireless communication device as a first comparative example.
Figure 3:
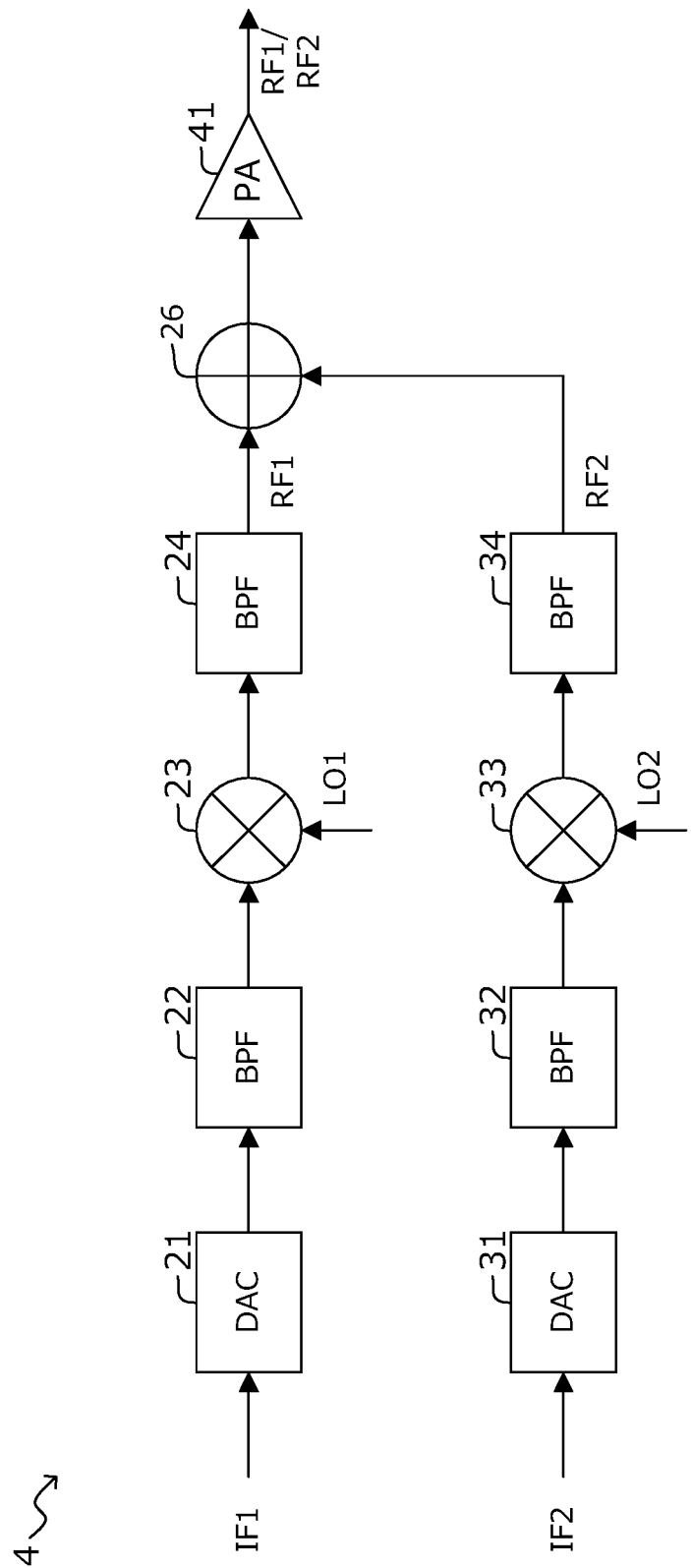
FIG. 3 is a block diagram illustrating an example of a functional configuration of a wireless communication device as a second comparative example.

An explanation follows regarding wireless communication devices 2 and 4 as first and second comparative examples with reference to FIGS. 2 and 3, before explaining the wireless communication device 1 according to the embodiment.

FIG. 2 is a block diagram illustrating an example of a functional configuration of the wireless communication device 2 as the first comparative example.

The wireless communication device 2 as the first comparative example, for example, includes DACs 21 and 31, BPFs 22 and 32, mixing units 23 and 33, BPFs 24 and 34, power amplifiers (PA) 25 and 35, and an adder 26.

Each of the DACs 21 and 31, for example, performs digital to analogue conversion of an input IF signal and outputs the converted IF signal. In the example in FIG. 2, the DAC 21 may perform digital to analogue conversion of an IF1 signal that is an input first IF signal, and the DAC 31 may perform digital to analogue conversion of an IF2 signal that is an input second IF signal. "IF signal" may be also referred to as "intermediate frequency signal".

Each of the BPFs 22 and 32, for example, removes a frequency component other than a desired frequency component, from the signal that has been input respectively from the DAC 21, 31. In the example in FIG. 2, the BPF 22 may remove a frequency component other than a desired frequency component, from the signal that has been input from the DAC 21, to extract the IF1 signal. In addition, the BPF 32 may remove a frequency component other than a desired frequency component, from the signal that has been input from the DAC 31, to extract the IF2 signal.

Each of the mixing units 23 and 33, for example, mixes an LO signal with the IF signal. In other words, each of the mixing units 23 and 33 may perform mixing of an LO signal with the IF signal. In the example in FIG. 2, the mixing unit 23 may mix a LO1 signal that is a first LO signal with the IF1 signal, and the mixing unit 33 may mix a LO2 signal that is a second LO signal with the IF2 signal. Here, "mixing units" indicated by the reference symbols 23 and 33 may be referred to as "mixers", "frequency converters", or "multipliers". In addition, "LO signal" may be referred to as "local signal" or "local oscillation signal".

Each of the BPFs 24 and 34, for example, removes a frequency component other than a frequency component of a desired RF signal, from the signal that has been respectively input from the mixing unit 23, 33. In the example in FIG. 2, the BPF 24 may remove a frequency component other than a frequency component of a RF1 signal that is a desired first RF signal, from the signal that has been input from the mixing unit 23. In addition, the BPF 34 may remove a frequency component other than a frequency component of a RF2 signal that is a desired second RF signal, from the signal that has been input from the mixing unit 33.

Each of the PAs 25 and 35, for example, amplifies transmission power of the RF signal. In the example in FIG. 2, the PA 25 may amplify transmission power of the RF1 signal, and the PA 35 may amplify transmission power of the RF2 signal.

The adder 26, for example, adds the RF1 signal that has been input from the PA 25 and the RF2 signal that has been input from the PA 35 together, and outputs the added signal to a transmission antenna (not illustrated in FIG. 2).

FIG. 3 is a block diagram illustrating an example of a functional configuration of the wireless communication device 4 as the second comparative example.

Recently, a multiband PA capable of amplifying plural frequency band signals has been developed. The wireless communication device 4 as the second comparative example, for example, includes a multiband PA 41 instead of the PAs 25 and 35 included in the wireless communication device 2 as the first comparative example.

The adder 26 illustrated in FIG. 3, for example, adds an RF1 signal that has been input from the BPF 24 and an RF2 signal that has been input from the BPF 34 together, and outputs the multiband signal obtained by adding the RF1 signal and the RF2 signal together, to the multiband PA 41.

The multiband PA 41, for example, amplifies transmission power of the RF1/RF2 signal that is the multiband signal that has been output from the adder 26, and outputs the signal to a transmission antenna (not illustrated in FIG. 3).

The wireless communication device 2 as the first comparative example illustrated in FIG. 2, for example, includes the two DACs, the two mixing units, the two PAs, and the four BPFs in order to generate two-band RF signals. The wireless communication device 4 as the second comparative example illustrated in FIG. 3, for example, includes the two DACs, the two mixing units, and the four BPFs in order to generate two-band RF signals.

In this manner, it takes a plural of the same circuit elements to be provided to generate multiband RF signals, thereby the circuit size is increased.

Therefore, as illustrated in FIG. 1, the wireless communication device 1 according to the embodiment, for example, includes an IF signal generator 11, a signal invertor 12, a DAC 13, a BPF 14, a mixing unit 15, a multi-BPF 16, a multiband PA 17, and a transmission antenna 18.

The IF signal generator 11, for example, generates plural (for example, two) IF signals respectively in a frequency band different to each other. In the example illustrated in FIG. 1, the IF signal generator 11 may generate an IF1 signal and an IF2 signal. The IF signal generator 11 may output the generated IF1 signal to the DAC 13 directly without passing through the signal invertor 12, and output the generated IF2 signal to the signal invertor 12. Conversely, the IF signal generator 11 may output the generated the IF2 signal to the DAC 13 directly without passing through the signal invertor 12, and output the generated IF1 signal to the signal invertor 12. Here, "IF signal generator" may be referred to as "signal generator".

Only one mixing unit 15 to mix an IF signal and an LO signal together is provided in the wireless communication device 1 according to the embodiment. Only one LO signal frequency can therefore be used for conversion of an IF signal frequency. Thus, in this example, the IF signal generator 11 generates the IF1 signal and the IF2 signal having different frequencies from each other. As a result, the wireless communication device 1 is capable of generating an RF1 signal and a RF2 signal having different frequencies from each other, with one LO signal.

The signal invertor 12, for example, inverts the polarity of the IF1 signal or the IF2 signal, and outputs the IF1 signal or the IF2 signal the polarity of which has been inverted. The signal invertor 12 may invert the polarity of the IF signal by rotating the spectrum of the IF signal by ±90° and invert the frequency component. Here, "signal invertor" may also be referred to as "polarity invertor".

The DAC 13, for example, performs digital to analogue conversion of the two IF signals (in other words, the IF1 signal and the IF2 signal) entered, and outputs the converted IF signals.

The BPF 14, for example, removes a frequency component other than the frequency components of the IF1 signal and the IF2 signal, from the signals that have been input from the DAC 13. Note that the BPF 14 may be a multi-BPF that passes IF signals in plural frequency bands.

The mixing unit 15, for example, combines (in other words, mixes) an LO signal with the IF1 signal or the IF2 signal using a heterodyne principle. In other words, the mixing unit 15 may upconvert the IF1 signal and the IF2 signal with the LO signal. By this, the mixing unit 15 may generate two mixed signals in a lower frequency band having a frequency lower than the LO signal frequency and generate two mixed signals in a higher frequency band having a frequency higher than the LO signal frequency. To put it differently, the mixing unit 15 may generate two mixed signals from the IF1 signal and generate two mixed signals from the IF2 signal, generating four mixed signals in total. The LO signal may be generated by a local oscillator (not illustrated). Here, "mixing unit" indicated by the reference symbol 15 may be also referred to as "mixer", "frequency converter", or "multiplier".

The multi-BPF 16, for example, passes one mixed signal having a frequency included in the lower frequency band and one mixed signal having a frequency included in the higher frequency band, out of the four mixed signals that have been generated by the mixing unit 15. Furthermore, in this example, the multi-BPF 16 passes one mixed signal generated from the IF1 signal and one mixed signal generated from the IF2 signal. The two mixed signals that have passed through the multi-BPF 16 may be referred to as RF signals. Namely, the multi-BPF 16 may select two mixed signals out of the four mixed signals and output the selected mixed signals as RF signals (in other words, an RF1 signal and an RF2 signal).

The multiband PA 17, for example, amplifies transmission power of the RF1 signal and the RF2 signal that have been input from the multi-BPF 16 and inputs the RF1 signal and the RF2 signal to the transmission antenna 18.

The transmission antenna 18, for example, transmits the RF1 signal and the RF2 signal that have been input from the multiband PA 17, to a reception device (not illustrated).

Figure 4:
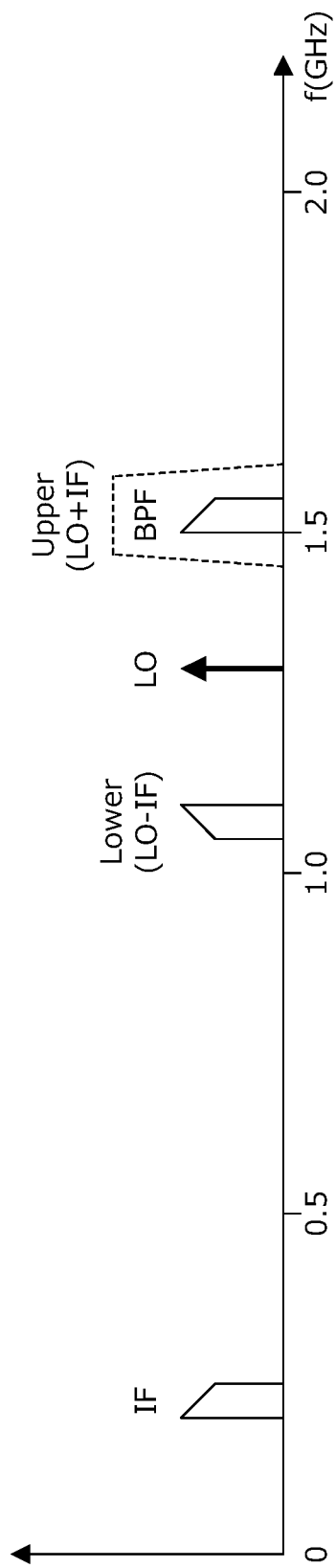
FIG. 4 is a diagram illustrating a relationship between frequencies of an IF signal, an LO signal, and an RF signal when generating a single band RF signal.

FIG. 4 is a diagram illustrating a relationship between frequencies of an IF signal, an LO signal, and an RF signal when generating a single band RF signal.

Plural (two in the example illustrated in FIG. 4) mixed signals may be generated by mixing an LO signal with an IF signal using the heterodyne principle.

A frequency of a first mixed signal out of the plural mixed signals may have a value obtained by subtracting the IF signal frequency from the LO signal frequency, in a lower frequency band ("Lower" in FIG. 4). A frequency of a second mixed signal out of the plural mixed signals may have a value obtained by adding the IF signal frequency to the LO signal frequency, in a higher frequency band ("Upper" in FIG. 4).

The mixed signal in the lower frequency band or in the higher frequency band may pass through the BPF. In the example illustrated in FIG. 4, the mixed signal in the higher frequency band passes through the BPF.

Figure 5:
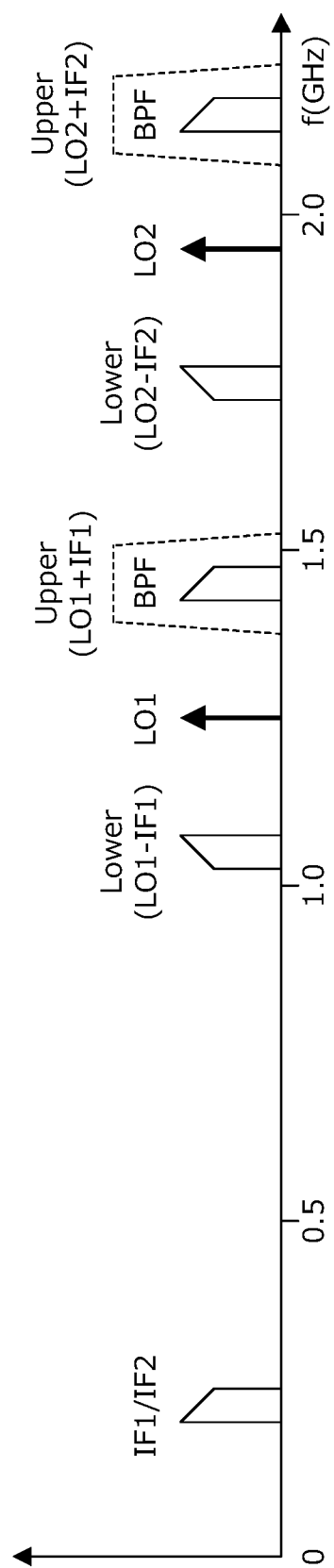
FIG. 5 is a diagram illustrating a relationship between frequencies of IF signals, LO signals, and RF signals when generating a multiband RF signal according to the first or second comparative example.

FIG. 5 is a diagram illustrating a relationship between frequencies of IF signals, LO signals, and RF signals when generating a multiband RF signal according to the first or second comparative example.

FIG. 5 illustrates an example in which two RF signals (namely, an RF1 signal and an RF2 signal) are generated from two IF signals having the same frequency (namely, an IF1 signal and an IF2 signal), according to the first and second comparative examples described above with reference to FIGS. 2 and 3.

Plural (four, in the example illustrated in FIG. 5) mixed signals may be generated by mixing the LO signals with the IF signals using the heterodyne principle.

A frequency of a first mixed signal out of the plural mixed signals may be a value that is obtained by subtracting an IF1 signal frequency from an LO1 signal frequency in the LO1 signal lower frequency band ("Lower" in FIG. 5). A frequency of a second mixed signal out of the plural mixed signals may be a value that is obtained by adding the IF1 signal frequency to the LO1 signal frequency in the LO1 signal higher frequency band ("Upper" in FIG. 4).

A frequency of a third mixed signal out of the plural mixed signals may be a value that is obtained by subtracting an IF2 signal frequency from an LO2 signal frequency in the LO2 signal lower frequency band ("Lower" in FIG. 5). In addition, a frequency of a fourth mixed signal out of the plural mixed signals may be a value that is obtained by adding the IF2 signal frequency to the LO2 signal frequency in the LO2 signal higher frequency band ("Upper" in FIG. 5).

The mixed signals in the lower frequency band or in the higher frequency band may pass through the BPF. In the example illustrated in FIG. 5, the mixed signal in the higher frequency band for the LO1 signal, generated based on the IF1 signal, and the mixed signal in the higher frequency band for the LO2 signal, generated based on the IF2 signal, pass through the BPF.

Figure 6:
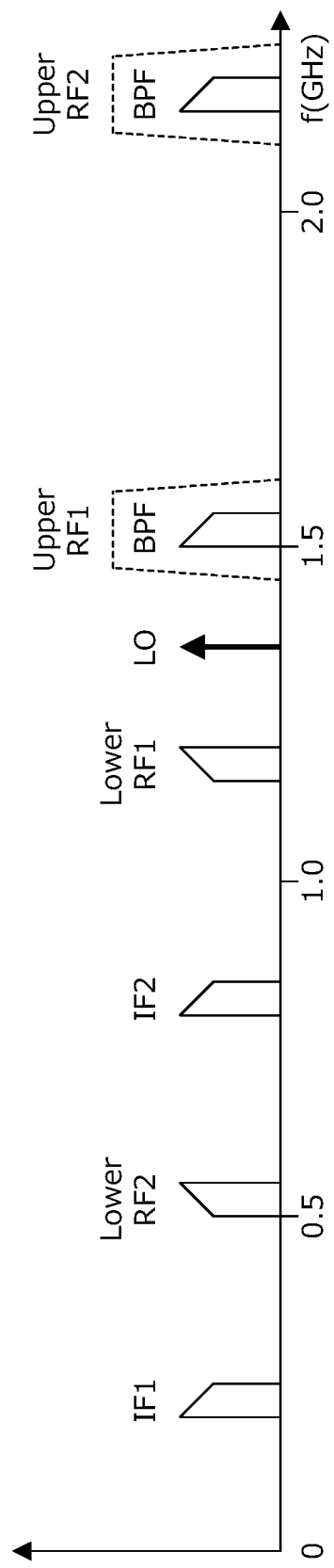
FIG. 6 is a diagram illustrating a relationship between frequencies of IF signals, an LO signal, and RF signals when generating a multiband RF signal according to a third comparative example.

FIG. 6 is a diagram illustrating a relationship between frequencies of IF signals, an LO signal, and RF signals when generating multiband RF signals according to a third comparative example.

FIG. 6 illustrates an example in which two RF signals (namely, an RF1 signal and an RF2 signal) are generated from two IF signals having different frequencies each other (namely, an IF1 signal and an IF2 signal) in a wireless communication device having a configuration similar to that of the wireless communication device 1 according to the embodiment. However, the wireless communication device according to the third comparative example does not include a signal invertor 12, unlike the wireless communication device 1 according to the embodiment. In addition, a signal pass band for each of the BPFs 14 and 16 may be changed as appropriate.

A mixed signal may be generated in a lower frequency band ("Lower" in FIG. 6) by subtracting a frequency of the IF1 signal from a frequency of the LO signal. A mixed signal may be generated in an higher frequency band ("Upper" in FIG. 6) by adding the frequency of the IF1 signal to the frequency of the LO signal.

A mixed signal may be generated in the lower frequency band ("Lower" in FIG. 6) by subtracting a frequency of the IF2 signal from the frequency of the LO signal. A mixed signal may be generated in the higher frequency band ("Upper" in FIG. 6) by adding the frequency of the IF2 signal to the frequency of the LO signal.

The mixed signals in the lower frequency band or the higher frequency band may pass though the BPF. In the example illustrated in FIG. 6, the two mixed signals in the higher frequency band pass through the BPF.

Figure 7:
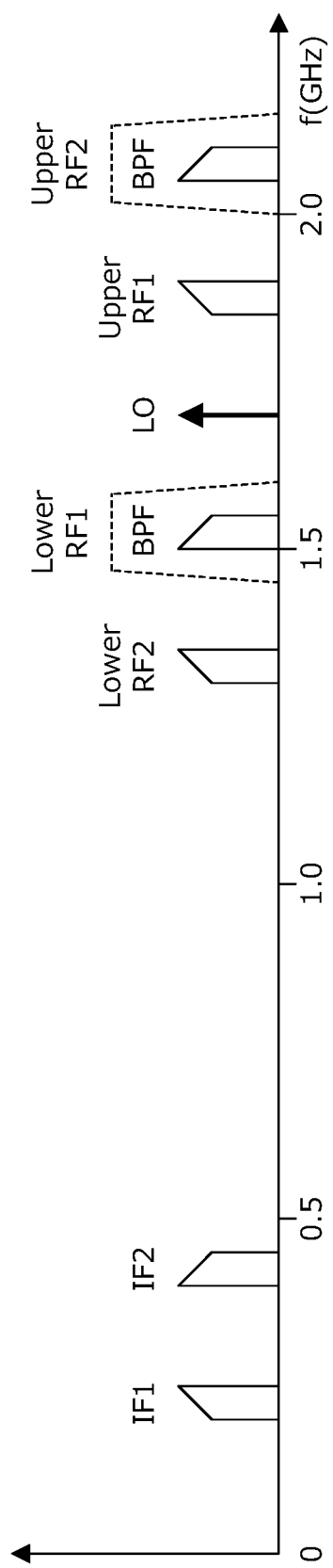
FIG. 7 is a diagram illustrating a relationship between frequencies of IF signals, an LO signal, and RF signals when generating a multiband RF signal according to the embodiment.

FIG. 7 is a diagram illustrating a relationship between frequencies of IF signals, an LO signal, and RF signals when generating multiband RF signals in the wireless communication device 1 according to the embodiment.

FIG. 7 illustrates an example in which two RF signals (namely, an RF1 signal and an RF2 signal) are generated from two IF signals having different frequencies each other (namely, an IF1 signal and an IF2 signal).

In the example illustrated in FIG. 7, the IF signal generator 11 may generate the IF1 signal and the IF2 signal. In addition, the IF signal generator 11 may input the generated IF1 signal to the signal invertor 12 and input the generated IF2 signal to the DAC 13.

The signal invertor 12 may invert the polarity of the IF1 signal that has been input from the IF signal generator 11, and input the IF1 signal the polarity of which has been inverted, to the DAC 13. In the example illustrated in FIG. 7, the polarity of the IF1 signal and the polarity of the IF2 signal that are input to the DAC 13 are inverted to each other.

The mixing unit 15 may generate a mixed signal of a frequency having a value obtained by subtracting a frequency of the IF1 signal from a frequency of the LO signal, in a lower frequency band ("Lower" in FIG. 7), by mixing the LO signal with the IF1 signal. Furthermore, the mixing unit 15 may generate a mixed signal of a frequency having a value obtained by adding the frequency of the IF1 signal to the frequency of the LO signal, in a higher frequency band ("Upper" in FIG. 7), by mixing the LO signal with the IF1 signal.

The mixing unit 15 may generate a mixed signal of a frequency having a value obtained by subtracting a frequency of the IF2 signal from the frequency of the LO signal, in the lower frequency band ("Lower" in FIG. 7), by mixing the LO signal with the IF2 signal. Furthermore, the mixing unit 15 may generate a mixed signal of a frequency having a value obtained by adding the frequency of the IF2 signal to the frequency of the LO signal, in the higher frequency band ("Upper" in FIG. 7), by mixing the LO signal with the IF2 signal.

The multi-BPF 16 may pass one mixed signal in the lower frequency band and one mixed signal in the higher frequency band out of the four mixed signals. In the example illustrated in FIG. 7, the multi-BPF 16 passes the mixed signal generated from the IF1 signal as an RF1 signal in the lower frequency band, and passes the mixed signal generated from the IF2 signal as an RF2 signal in the higher frequency band.

Figure 8:
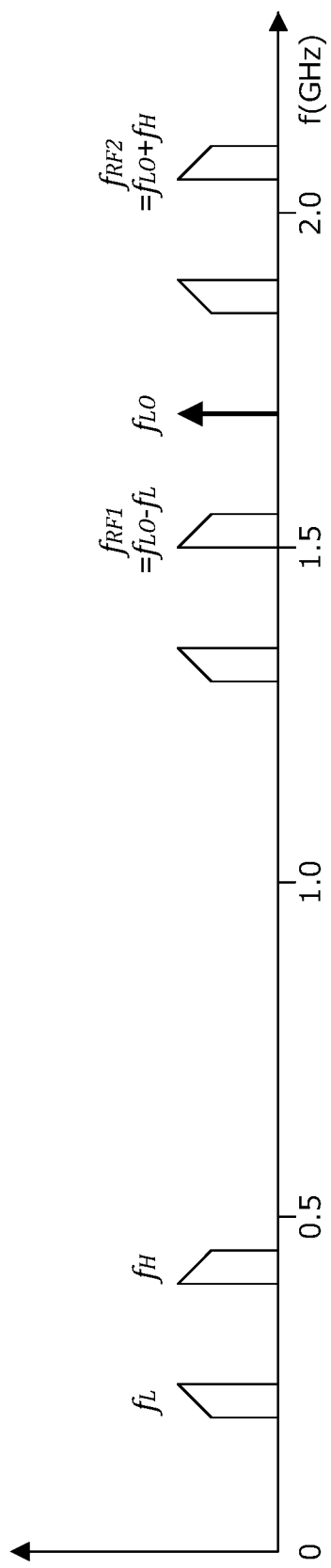
FIG. 8 is a diagram illustrating a frequency parameter relative to frequencies illustrated in FIG. 7.

FIG. 8 is a diagram illustrating a frequency parameter relative to frequencies illustrated in FIG. 7.

In the embodiment, for example, a relationship between a frequency $f_L$ of the IF1 signal and a frequency $f_H$ of the IF2 signal ($f_L < f_H$), a frequency $f_{LO}$ of the LO signal, and a frequency $f_{RF1}$ of the RF1 signal and a frequency $f_{RF2}$ of the RF2 signal satisfies both of the following equations 1 and 2. In addition, the frequencies $f_{RF1}$ and $f_{RF2}$ may be referred to as central frequencies of the two mixed signals that pass through the multi-BPF 16. Here, "central frequency" may be an arithmetic mean or a geometric mean of the frequencies of the lower limit and the frequencies of the upper limit of signals for each of the bands that pass through the multi-BPF 16.

$$f_L + f_H = f_{RF2} - f_{RF1} \quad \text{(equation 1)}$$

$$f_{LO} = \frac{(f_{RF1} + f_{RF2})}{2} + \frac{f_L - f_H}{2} \quad \text{(equation 2)}$$

As illustrated in FIG. 8, the frequency of the RF1 signal may be "$f_{RF1} = f_{LO} - f_L$", and the frequency of the RF2 signal may be "$f_{RF2} = f_{LO} + f_H$".

The central frequency $f_L$ of the IF1 signal, the central frequency $f_H$ of the IF2 signal, and the frequency $f_{LO}$ of the LO signal may be calculated based on the central frequency $f_{RF1}$ of a desired RF1 signal and the central frequency $f_{RF2}$ of a desired RF2 signal, and the equations 1 and 2. The calculation based on the equations 1 and 2 is, for example, performed by a processor (not illustrated) or a field programmable gate array (FPGA) (not illustrated).

Note that a relationship between the central frequency $f_L$ of the IF1 signal and the central frequency $f_H$ of the IF2 signal ($f_L < f_H$), the central frequency $f_{LO}$ of the LO signal, and the central frequency $f_{RF1}$ of the RF1 signal and the central frequency $f_{RF2}$ of the RF2 signal ($f_{RF1} < f_{RF2}$) may satisfy the following equation 2', instead of the equation 2. In this case, the frequency of the RF1 signal may be "$f_{RF1} = f_{LO} + f_L$", and the frequency of the RF2 signal may be "$f_{RF2} = f_{LO} - f_H$".

$$f_{LO} = \frac{(f_{RF1} + f_{RF2})}{2} + \frac{f_H - f_L}{2} \quad \text{(equation 2')}$$

Figure 9:
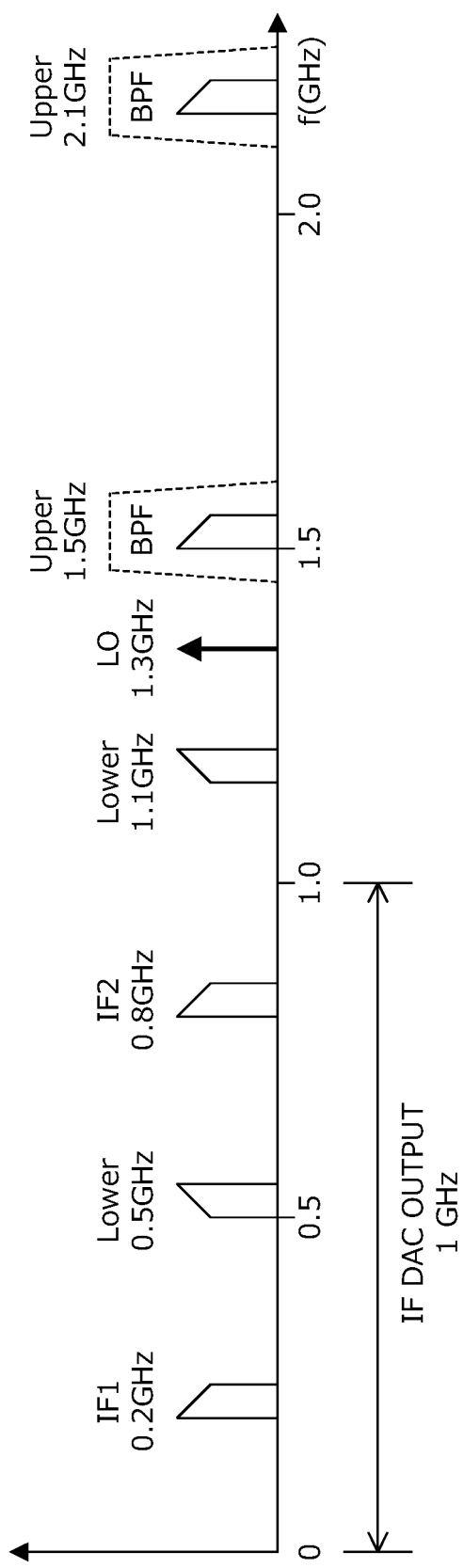
FIG. 9 is a diagram illustrating an example of a DAC IF signal output bandwidth relative to frequencies illustrated in FIG. 6.

FIG. 9 is a diagram illustrating an example of a DAC IF signal output bandwidth relative to frequencies illustrated in FIG. 6. FIG. 10 is a diagram illustrating an example of the DAC 13 IF signal output bandwidth relative to frequencies illustrated in FIG. 7.

In the wireless communication device according to the third comparative example, the multi-BPF passes the two mixed signals in the higher frequency band as RF signals, as illustrated in FIG. 9.

In the example illustrated in FIG. 9, an IF1 signal having the central frequency of 0.2 GHz and an IF2 signal having the central frequency of 0.8 GHz are generated in order to generate RF signals having the central frequencies of respectively 1.5 GHz and 2.1 GHz. Note that the frequency of the LO signal is 1.3 GHz. The wireless communication device according to the third comparative example, for example, includes the DAC having an output width of approximately 1 GHz in order to perform digital to analogue conversion of the IF1 signal and the IF2 signal, as illustrated in FIG. 9. When a calculation is performed, for example, using a quadruple-oversampling, the wireless communication device according to the third comparative example includes the DAC with a sampling rate of 4 GHz.

In the wireless communication device 1 according to the embodiment, the multi-BPF 16, in the example illustrated in FIG. 10, passes as RF signals one mixed signal in the lower frequency band and one mixed signal in the higher frequency band.

In the example illustrated in FIG. 10, the IF signal generator 11 generates an IF1 signal having the central frequency of 0.2 GHz and an IF2 signal having the central frequency of 0.4 GHz, such that RF signals having the central frequencies of respectively 1.5 GHz and 2.1 GHz are output by the multi-BPF 16. Note that the frequency of the LO signal is 1.7 GHz. The wireless communication device 1 according to the embodiment, for example, includes the DAC 13 having an output width of approximately 0.5 GHz in order to perform digital to analogue conversion of the IF1 signal and the IF2 signal, as illustrated in FIG. 10. When a calculation is performed, for example, using a quadruple-oversampling, the wireless communication device 1 according to the embodiment includes the DAC 13 with a sampling rate of 2 GHz.

Thus, the DAC 13 provided to the wireless communication device 1 according to the embodiment may have a lower conversion rate than a conversion rate of the DAC provided to the wireless communication device according to the third comparative example. As a result, a reduction in a manufacturing cost of the wireless communication device 1 is achieved.

The mixing unit 15 generates the two mixed signals in the lower frequency band having lower frequency than the LO signal frequency, and the two mixed signals in the higher frequency band having higher frequency than the LO signal frequency, by mixing the two IF signals with the LO signal. Then, the multi-BPF 16 passes one mixed signal having a frequency included in the lower frequency band and passes one mixed signal having a frequency included in the higher frequency band, out of the mixed signals generated in the mixing unit 15.

This, accordingly, enables RF signals having plural frequencies to be efficiently generated. Specifically, since plural RF signals may be generated by the single mixing unit 15 and the single multi-BPF 16, the circuit size of the wireless communication device 1 may be reduced. In addition, since a frequency difference between the two IF signals may be reduced, a reduction in the conversion rate of the DAC 13 is achieved, and a reduction in a manufacturing cost of the wireless communication device 1 is thereby achieved.

The spectrums of the two mixed signals generated from the IF1 signal by the mixing unit 15 are inverted to each other. The spectrums of the two mixed signals generated from the IF2 signal by the mixing unit 15 are also inverted to each other.

Therefore, the multi-BPF 16 passes one mixed signal generated from the IF1 signal out of the two IF signals, and one mixed signal generated from the IF2 signal out of the two IF signals.

The multi-BPF 16, accordingly, is able to generate one RF1 signal and one RF2 signal, the spectrums of which are not inverted to each other.

The IF signal generator 11 generates the IF1 signal and the IF2 signal. Then, the signal invertor 12 inverts the spectrum of one of the IF1 signal and the IF2 signal generated by the IF signal generator 11.

Accordingly, the multi-BPF 16 is enabled to output of the RF1 signal and the RF2 signal the spectrums of which are not inverted to each other.

A relationship between the central frequencies $f_L$ and $f_H$ ($f_L < f_H$) of the two IF signals, the frequency $f_{LO}$ of the LO signal, and the central frequencies $f_{RF1}$ and $f_{RF2}$ ($f_{RF1} < f_{RF2}$) of the two mixed signals that pass through the multi-BPF 16 satisfies the following equations.

$$f_L + f_H = f_{RF2} - f_{RF1}$$
$$f_{LO} = \frac{(f_{RF1} + f_{RF2})}{2} + \frac{f_L - f_H}{2} \text{ or}$$
$$f_{LO} = \frac{(f_{RF1} + f_{RF2})}{2} + \frac{f_H - f_L}{2}$$

As a result, the central frequency $f_L$ of the IF1 signal, the central frequency $f_H$ of the IF2 signal, and the frequency $f_{LO}$ of the LO signal may be calculated accurately based on the central frequency $f_{RF1}$ of the desired RF1 signal and the central frequency $f_{RF2}$ of the desired RF2 signal.

B. Others

The technology described herein is not limited to the above-described embodiments, and may be implemented in various modifications within a range not departing from the gist of the embodiments. The configurations and the processing according to the embodiments may be adopted and rejected as appropriate, or may be combined as appropriate.

In the above-described embodiment, the wireless communication device 1 generates two RF signals as multiband RF signals, but the embodiments are not limited thereto. The wireless communication device 1 may generate three or more RF signals. In this case, the IF signal generator 11 may generate three or more IF signals. In addition, the signal invertor 12 may invert the spectrums of at least some of the three or more IF signals generated by the IF signal generator 11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   a mixer configured to generate two mixed signals in a lower frequency band than a frequency of a local signal and two mixed signals in a higher frequency band than the frequency of the local signal by mixing the local signal with two intermediate frequency signals; and
   a filter configured to pass one of the two mixed signals in the lower frequency band and one of the two mixed signals in the higher frequency band,
   wherein a relationship between frequencies $f_L$ and $f_H$ ($f_L < f_H$) of the two intermediate frequency signals, a frequency $f_{LO}$ of the local signal, and frequencies $f_{RF1}$ and $f_{RF2}$ ($f_{RF1} < f_{RF2}$) of the two mixed signals that pass through the filter satisfies a following expression:

$$f_L + f_H = f_{RF2} - f_{RF1},$$
$$f_{LO} = \frac{(f_{RF1} + f_{RF2})}{2} + \frac{f_L - f_H}{2} \text{ or}$$
$$f_{LO} = \frac{(f_{RF1} + f_{RF2})}{2} + \frac{f_H - f_L}{2}.$$

2. The wireless communication device according to claim 1, wherein the filter is configured to pass one of the two mixed signals, which is generated from one of the two intermediate frequency signals, in the lower frequency band and one of the two mixed signal, which is generated from the other of the two intermediate frequency signals, in the higher frequency band.

3. The wireless communication device according to claim 2, further comprising:

a signal generator configured to generate the two intermediate frequency signals; and a signal inverter configured to invert a spectrum of one of the two intermediate frequency signals generated by the signal generator.

4. The wireless communication device according to claim 1, wherein two frequency bands of the two inteimediate frequency signals are different each other.

5. A wireless signal processing method comprising:

generating two mixed signals in a lower frequency band than a frequency of a local signal and two mixed signals in a higher frequency band than the frequency of the local signal by mixing the local signal with two intermediate frequency signals; and passing one of the two mixed signals in the lower frequency band and one of the two mixed signals in the higher frequency band, wherein a relationship between frequencies $f_L$ and $f_H$ ($f_L < f_H$) of the two intermediate frequency signals, a frequency $f_{LO}$ of the local signal, and frequencies $f_{RF1}$ and $f_{RF2}$ ($f_{RF1} < f_{RF2}$) of the two mixed signals that pass through the filter satisfies a following expression:

$$f_L + f_H = f_{RF2} - f_{RF1},$$

$$f_{LO} = \frac{(f_{RF1} + f_{RF2})}{2} + \frac{f_L - f_H}{2} \text{ or}$$

$$f_{LO} = \frac{(f_{RF1} + f_{RF2})}{2} + \frac{f_H - f_L}{2}.$$

* * * * *